US012733049B2

(12) United States Patent
Narula et al.

(10) Patent No.: US 12,733,049 B2
(45) Date of Patent: Sep. 8, 2026

(54) SYSTEM AND METHOD OF BLUETOOTH SILENT PAIRING OF A PERIPHERAL DEVICE WITH VIRTUAL PAIRING SLOTS

(71) Applicant: Dell Products LP, Round Rock, TX (US)

(72) Inventors: Harpreet S. Narula, Austin, TX (US); Kai Leong Wong, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 295 days.

(21) Appl. No.: 18/650,345

(22) Filed: Apr. 30, 2024

(65) Prior Publication Data

US 2025/0338331 A1 Oct. 30, 2025

(51) Int. Cl.
*H04W 76/14* (2018.01)
*H04W 12/062* (2021.01)
*H04W 72/40* (2023.01)

(52) U.S. Cl.
CPC ......... *H04W 76/14* (2018.02); *H04W 12/062* (2021.01); *H04W 72/40* (2023.01)

(58) Field of Classification Search
CPC ... H04W 76/14; H04W 12/062; H04W 72/40; H04W 12/068; H04W 12/50; H04W 4/80; G06Q 20/40145; G06F 3/0613
See application file for complete search history.

(56) References Cited

U.S. PATENT DOCUMENTS 8,438,319 B1 5/2013 Edney
8,732,328 B2 5/2014 Margulis
9,344,237 B2 5/2016 Margulis
10,877,716 B2 12/2020 Margulis
11,132,164 B2 9/2021 Margulis
12,022,368 B2 * 6/2024 Azam ..................... H04W 4/80
2004/0188519 A1 * 9/2004 Cassone ........... G06Q 20/40145 235/382
2008/0301396 A1 * 12/2008 Hamada ................ G06F 3/0613 711/E12.078
2013/0174252 A1 * 7/2013 Weber .................. H04W 12/50 726/20
2017/0031644 A1 2/2017 Margulis
2017/0111346 A1 * 4/2017 Tung ...................... H04W 4/80
2023/0289213 A1 9/2023 Liu
2024/0012766 A1 1/2024 Narula

* cited by examiner

*Primary Examiner* — Vinncelas Louis
(74) *Attorney, Agent, or Firm* — Prol Intellectual Property Law, PLLC; H. Kenneth Prol

(57) ABSTRACT

A wireless peripheral device includes a hardware microcontroller, a wireless radio to pair the wireless peripheral device to a plurality of information handling systems. The hardware microcontroller to detect a dongle installed at an information handling systems for wireless dongle transceptions between the wireless peripheral device and the information handling system. The hardware microcontroller to execute code instructions of a silent virtual slot provisioning module to, where the dongle is detected, request Bluetooth® or Bluetooth® Low Energy pairing (BT pairing) pre-authorization data from the information handling system via the dongle to generate BT pairing data. The hardware processor to execute the code instructions of the silent virtual slot provisioning module to map the generated BT pairing data to a first virtual pairing slot among a plurality of virtual pairing slots at a first manual pairing channel on the wireless peripheral device among a plurality of manual pairing channels.

20 Claims, 4 Drawing Sheets

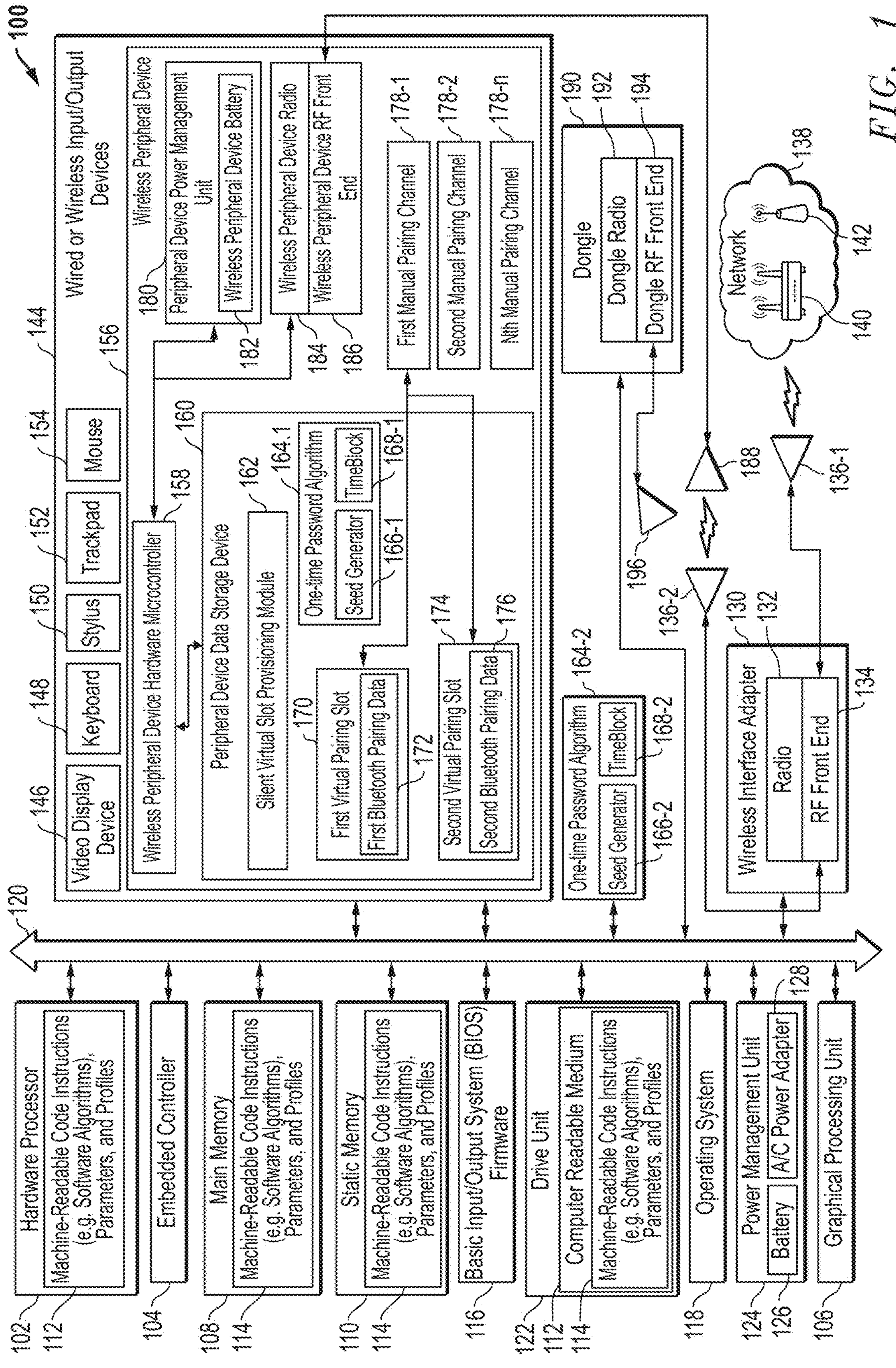
100
Hardware Processor
Machine-Readable Code Instructions (e.g. Software Algorithms), Parameters, and Profiles
102
112
Embedded Controller
104
Main Memory
Machine-Readable Code Instructions (e.g. Software Algorithms), Parameters, and Profiles
108
114
Static Memory
Machine-Readable Code Instructions (e.g. Software Algorithms), Parameters, and Profiles
110
114
Basic Input/Output System (BIOS) Firmware
116
Drive Unit
Computer Readable Medium
Machine-Readable Code Instructions (e.g. Software Algorithms), Parameters, and Profiles
122
112
114
Operating System
118
Power Management Unit
Battery
A/C Power Adapter
124
126
128
Graphical Processing Unit
106
120
Wired or Wireless Input/Output Devices
144
Video Display Device
146
Keyboard
148
Stylus
150
Trackpad
152
Mouse
154
Wireless Peripheral Device
156
Wireless Peripheral Device Hardware Microcontroller
158
Peripheral Device Data Storage Device
160
Silent Virtual Slot Provisioning Module
162
One-time Password Algorithm
164-1
Seed Generator
166-1
TimeBlock
168-1
First Virtual Pairing Slot
170
First Bluetooth Pairing Data
172
Second Virtual Pairing Slot
174
Second Bluetooth Pairing Data
176
Peripheral Device Power Management Unit
180
Wireless Peripheral Device Battery
182
Wireless Peripheral Device Radio
184
Wireless Peripheral Device RF Front End
186
First Manual Pairing Channel
178-1
Second Manual Pairing Channel
178-2
Nth Manual Pairing Channel
178-n
One-time Password Algorithm
164-2
Seed Generator
166-2
TimeBlock
168-2
Dongle
190
Dongle Radio
192
Dongle RF Front End
194
196
188
136-2
136-1
Wireless Interface Adapter
130
Radio
132
RF Front End
134
Network
138
140
142
FIG. 1

SYSTEM AND METHOD OF BLUETOOTH SILENT PAIRING OF A PERIPHERAL DEVICE WITH VIRTUAL PAIRING SLOTS

FIELD OF THE DISCLOSURE

The present disclosure generally relates to pairing a wireless peripheral device with an information handling system. The present disclosure more specifically relates to silently pairing a wireless peripheral device with an information handling system using, initially, a wireless dongle and creating at least one Bluetooth® or Bluetooth Low Energy (BLE) virtual pairing slot within a manual selection channel.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more workspace productivity applications, or gaming applications or the like. Further, the information handling system may include a radio to operatively couple a peripheral device to the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 1 is a block diagram illustrating an information handling system that may be operatively coupled to a wireless peripheral device that includes silent virtual slot provisioning to pair a plurality of information handling systems to the same manual pairing channel according to an embodiment of the present disclosure;

The use of the same reference symbols in different drawings may indicate similar or identical items.

DETAILED DESCRIPTION OF THE DRAWINGS

Figure 2:
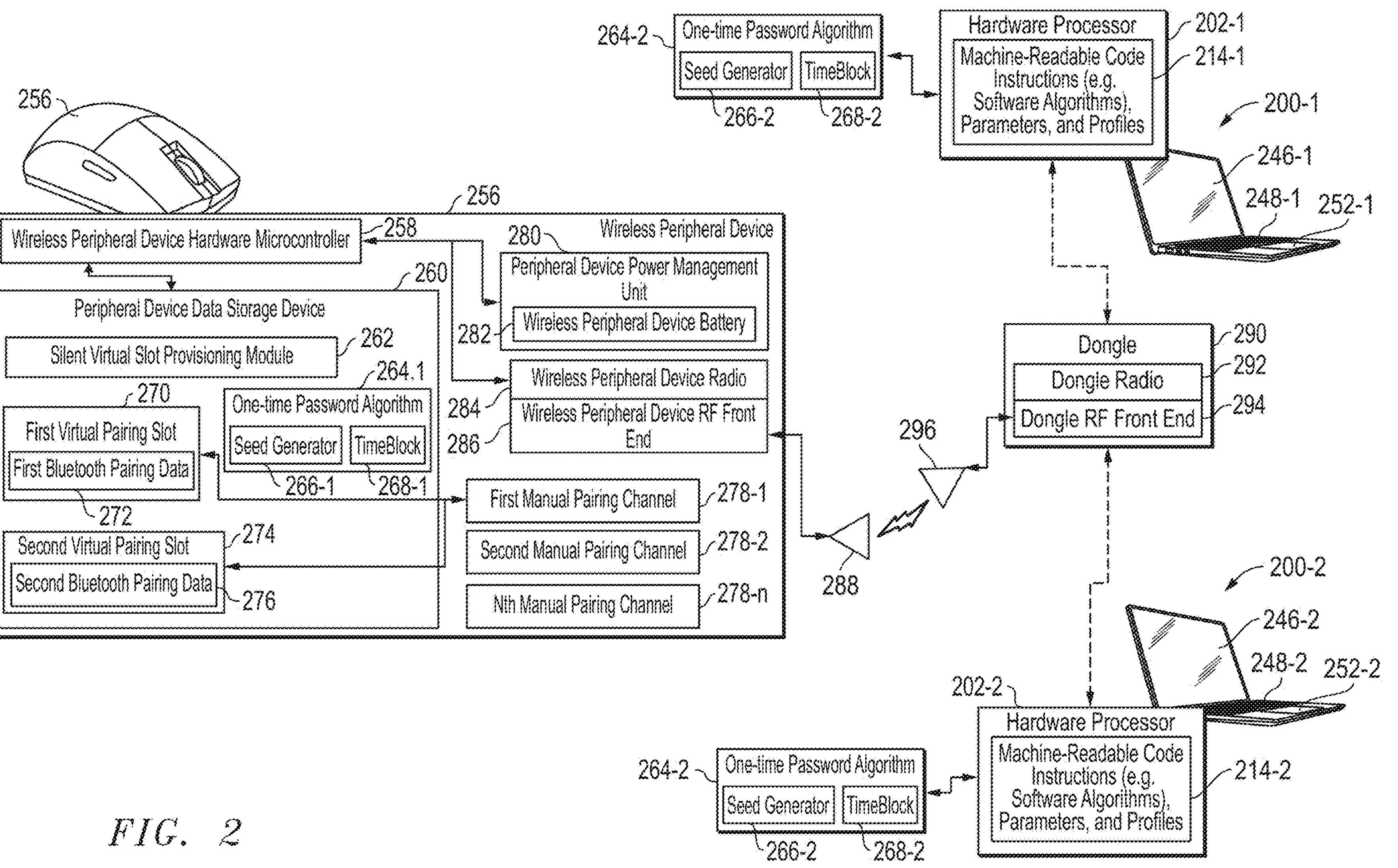
FIG. 2 is a graphic and block diagram illustrating an information handling system that may be operatively coupled to a wireless peripheral device that includes silent virtual slot provisioning to pair a plurality of information handling systems to the same manual pairing channel according to another embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems may be operatively coupled to a peripheral device that allows the user to interact with the information handling system. These peripheral devices may include a mouse, a keyboard, a video display device, a stylus, a trackpad, and the like that allows a user to provide input to the information handling system and receive output from the information handling system. These peripheral devices may be wirelessly couplable to the information handling system through the use of various radio frequency (RF) radios in the information handling system and the peripheral device and/or a dongle that is operatively coupled to the information handling system via, for example, a universal serial bus (USB) port. This operative coupling includes an initial pairing of the wireless peripheral device to the information handling system, the exchange of pairing data between the wireless peripheral device and information handling system, and bonding or operatively coupling of the wireless peripheral device to the information handling system when authorized to do so.

Often, the user is to provide input or otherwise interface with the information handling system and/or wireless peripheral device such as inputting a pairing code or other authentication data used to confirm the pairing authentication and proceed to operative coupling of the wireless peripheral device to the information handling system. Still further, where dongles are used by the wireless peripheral device to communicate with the information handling system, a user may take the information handling system and wireless peripheral device away from the dongle and may be incapable of using the wireless peripheral device with the information handling system without that dongle. This may occur where the dongle is inserted into a USB port of a docking station operatively coupled to the information handling system and the user walks away from the docking station with the information handling system and wireless peripheral device (e.g., changes location of the workspace at least temporarily). In an example embodiment, various wireless protocols may be used with wireless peripheral devices. For example, when a dongle is used in some embodiments herein, a proprietary radiofrequency (RF) protocol may be used with proprietary modulation to provide additional or different performance or operational options for wireless coupling, including some pairing method options, which are different from standard protocols such as Bluetooth® (BT) or Bluetooth® Low Energy (BLE) protocols. An issue may arise because the use of the dongle precludes a user from pairing the wireless peripheral device with the information handling system that the dongle was used for pairing, such as via a docking station, by using other methods such as establishing a Bluetooth® (BT) or BLE wireless connection with the information handling system. Indeed, no algorithms or methods are available to the user to bind the wireless peripheral device to the information handling system both via the dongle and a BT or BLE wireless connection. Similarly, no algorithms or methods are available to the user to bind the wireless peripheral device to the information handling system both via the dongle, using a dongle with either a proprietary RF protocol or a BT protocol, and bind using a BT or BLE wireless connection directly with the information handling system.

The present specification describes a wireless peripheral device that includes a hardware microcontroller, a data storage device, a wireless radio to operatively pair the wireless peripheral device to a plurality of information handling systems, and a power management unit to provide power to the hardware microcontroller, the data storage device, and the wireless radio. In an embodiment, the hardware microcontroller may detect the presence of a dongle allowing for wireless dongle transceptions between the wireless peripheral device and a first information handling system. This radio frequency pairing may be via a proprietary RF protocol in some embodiments. Still further, the hardware microcontroller executes computer-readable program code of a silent virtual slot provisioning module to, where the dongle is detected, request Bluetooth® or BLE pairing (BT pairing) pre-authorization data from the information handling system to generate Bluetooth® or BLE pairing (BT pairing) data and establish a Bluetooth® or BLE wireless connection with the information handling system in an embodiment. Hereinafter, Bluetooth® or BLE pairing pre-authorization data may be referred to as BT pairing pre-authorization data and generated Bluetooth® or BLE pairing data may be referred to BT pairing data in embodiments herein. In an embodiment, the hardware processor further executes the computer-readable program code of the silent virtual slot provisioning module to map the generated BT pairing data to a first virtual pairing slot among a plurality of virtual pairing slots at a first manual pairing channel on the wireless peripheral device among a plurality of manual pairing channels. Thus, the systems and methods described herein may provide for the provisioning of one or more virtual BT channels or virtual pairing slots associated with a RF dongle connected to the information handling system via silent pairing processes described herein. Still further, the systems and methods described herein provide for dongle radio frequency (RF) wireless connection and BT or BLE wireless connection with the same information handling system that, when the dongle is not present, automatically switches from the dongle RF wireless connection to the BT or BLE wireless connection when the dongle is no longer detected and available.

In an embodiment, a priority mode may be defined so that if and when the dongle is discovered again, the wireless peripheral device again switches back from communicating with the information handling system via the BT or BLE wireless connection to communicating with the information handling system via the dongle RF wireless connection. Thus, in an embodiment, the hardware microcontroller may execute the computer-readable program code of the silent virtual slot provisioning module to prioritize transceptions via the dongle by maintaining wireless transceptions with the information handling system via the dongle when the dongle is detected and switch to the first virtual pairing slot to use a Bluetooth wireless communication when the dongle is not detected.

In an embodiment, the BT pairing pre-authorization data includes a Bluetooth address of the information handling system, a pairing passcode seed, a session identification value, and a time stamp. In an embodiment, the hardware microcontroller may execute a one-time password algorithm to generate a one-time passcode to securely operatively couple the wireless peripheral device to the information handling system. In some example embodiments, the hardware microcontroller may use the Bluetooth address of the information handling system to broadcast the BT pairing data via extended directed advertisement to the information handling system.

During operation in some embodiments, the hardware microcontroller may generate additional BT pairing data and map the additional pairing data to additional virtual slots at the first manual pairing channel on the wireless peripheral device and overwrite BT pairing data when all virtual slots have been mapped, the overwriting process including a first-in, first-out overwriting process. This allows a user to overwrite BT pairing data used to communicate with a first information handling system with BT pairing data used with a new information handling system. Thus, in an embodiment, the hardware microcontroller may execute the computer-readable program code of the silent virtual slot provisioning module to associate a virtual slot at the first manual pairing channel based on the dongle being detected at different information handling systems. In some embodiments, the wireless peripheral device includes a manual channel selection button that allows a user to manually toggle between the first manual pairing channel and one or more additional manual pairing channels among the plurality of manual pairing channels. These additional manual pairing channels may provide for the wireless peripheral device to also be paired with and automatically couple with a plurality of information handling systems and under BT protocol or proprietary RF protocol depending on whether a dongle has traveled to a new location of a different information handling system in embodiments herein.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 140, a base station transceiver 142, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 108, (volatile (e.g., random-access memory, etc.), or static memory 110, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, or any combination thereof. Additional components of the information handling system 100 may include one or more storage devices such as static memory 110 or drive unit 122. The information handling system 100 may include or interface with one or more communications ports for communicating with external devices, as well as various input and output (I/O) devices 144, such as a mouse 154, a trackpad 152, a stylus 150, a keyboard 148, a video/graphics display device 146, the dongle 190 described herein, as well as the wireless peripheral device 156 described herein, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 114 that may operate on servers or systems, remote data centers, or on-box in individual client information handling systems according to various embodiments herein. In some embodiments, it is understood any or all portions of instructions (e.g., software algorithms), parameters, and profiles 114 may operate on a plurality of information handling systems 100.

The information handling system 100 may include the hardware processor 102 such as a central processing unit (CPU) or other hardware processing resources. Any of the hardware processing resources may operate to execute code that is either firmware or software code. Moreover, the information handling system 100 may include memory such as main memory 108, static memory 110, and disk drive unit 122 (volatile (e.g., random-access memory, etc.), nonvolatile memory (read-only memory, flash memory etc.) or any combination thereof or other memory with computer readable medium 112 storing instructions (e.g., software algorithms), parameters, and profiles 114 executable by the hardware processor 102, EC 104, GPU 106, or any other hardware processing device. The information handling system 100 may also include one or more buses 120 operable to transmit communications between the various hardware components such as any combination of various I/O devices 144 as well as between hardware processors 102, an EC 104, the operating system (OS) 118, the basic input/output system (BIOS) 116, the wireless interface adapter 130, or a radio module, among other components described herein. In an embodiment, the hardware processor 102, EC 104, and/or GPU 106 may execute one or more bus drivers in order to transmit this data between the information handling system 100 and the input/output devices 144 described herein. In an embodiment, the information handling system 100 may be in wired or wireless communication with the I/O devices 144 such a keyboard 148, a mouse 154, video display device 146, stylus 150, trackpad 152, the wireless peripheral device 156 and dongle 190 described herein, among other peripheral devices.

As described herein, the information handling system 100 further includes a video/graphics display device 146. The video/graphics display device 146 in an embodiment may function as a liquid crystal display (LCD), an organic light emitting diode (OLED), a flat panel display, or a solid-state display. It is appreciated that the video/graphics display device 146 may be wired or wireless and may be an external video/graphics display device 146 that allows a user to increase the desktop area by extending the desktop in an embodiment. Additionally, as described herein, the information handling system 100 may include or be operatively coupled to a cursor control device (e.g., a trackpad 152, or gesture or touch screen input), a stylus 150, and/or a keyboard 148, among others that allows the user to interface with the information handling system 100 via the video/graphics display device 146. Information handling system 100 may also be operatively coupled to a wired or wireless input/output device 144 such as the wireless peripheral device 156 or other hardware devices that may include a hardware processing device such as a hardware processor, microcontroller, or other hardware processing resource. Various drivers and hardware control device electronics may be operatively coupled to operate the I/O devices 144 according to the embodiments described herein. The present specification contemplates that the I/O devices 144 may be wired or wireless.

A network interface device of the information handling system 100 may be wired or wireless such as shown with wireless interface adapter 130 that can provide wireless connectivity among devices such as with Bluetooth® or to a network 138, e.g., a wide area network (WAN), a local area network (LAN), wireless local area network (WLAN), a wireless personal area network (WPAN), a wireless wide area network (WWAN), or other network. In embodiments described herein, the wireless interface device 130 with its radio 132, RF front end 134 and antenna 136 is used to communicate with the wireless peripheral devices including the wireless peripheral device 156 described herein, via, for example, a Bluetooth® or Bluetooth® Low Energy (BLE) protocols or any proprietary RF protocol such as those may utilize similar frequency ranges but proprietary modulation and data transmission characteristics. In embodiments, Bluetooth®, BLE, proprietary RF protocol, or other WPAN or WLAN protocols and plural such protocols may be used for communication with and among a wireless peripheral device 156 or any other wireless peripheral device to be paired with the information handling system 100 or other information handling systems.

In other embodiments, a WAN, WWAN, LAN, and WLAN may each include an AP 140 or base station 142 used to operatively couple the information handling system 100 to a network 138 via a wireless interface adapter 130. In a specific embodiment, the network 138 may include macro-cellular connections via one or more base stations 142 or a wireless AP 140 (e.g., Wi-Fi), or such as through licensed or unlicensed WWAN small cell base stations 142. Connectivity may be via wired or wireless connection. For example, wireless network wireless APs 140 or base stations 142 may be operatively connected to the information handling system 100. Wireless interface adapter 130 may include one or more RF (RF) subsystems (e.g., radio 132) with transmitter/receiver circuitry, modem circuitry, one or more antenna RF (RF) front end circuits 134, one or more wireless controller circuits, amplifiers, antennas 136 and other circuitry of the radio 132 such as one or more antenna ports used for wireless communications via multiple radio access technologies (RATs). The radio 132 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, proprietary RF protocol, or similar wireless standards may be used. Wireless interface adapter 130 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable code instructions, parameters, and profiles 114 or receives and executes instructions, parameters, and profiles 114 responsive to a propagated signal, so that a hardware device connected to a network 138 may communicate voice, video, or data over the network 138. Further, the instructions 114 may be transmitted or received over the network 138 via the network interface device or wireless interface adapter 130.

The information handling system 100 may include a set of instructions 114 that may be executed to cause the computer system to perform any one or more of the methods or computer-based functions disclosed herein. For example, instructions 114 may be executed by a hardware processor 102, GPU 106, EC 104 or any other hardware processing resource and may include software agents, or other aspects or components used to execute the methods and systems described herein. Various software modules comprising application instructions 114 may be coordinated by an OS 118, and/or via an application programming interface (API) include a unified device API described herein. An example OS 118 may include Windows®, Android®, and other OS types. Example APIs may include Win 32, Core Java API, or Android APIs.

In an embodiment, the information handling system 100 may include a disk drive unit 122. The disk drive unit 122 and may include machine-readable code instructions, parameters, and profiles 114 in which one or more sets of machine-readable code instructions, parameters, and profiles 114 such as firmware or software can be embedded to be executed by the hardware processor 102 or other hardware processing devices such as a GPU 106 or EC 104, or other microcontroller unit to perform the processes described herein. Similarly, main memory 108 and static memory 110 may also contain a computer-readable medium for storage of one or more sets of machine-readable code instructions, parameters, or profiles 114 described herein. The disk drive unit 122 or static memory 110 also contain space for data storage. Further, the machine-readable code instructions, parameters, and profiles 114 may embody one or more of the methods as described herein. In a particular embodiment, the machine-readable code instructions, parameters, and profiles 114 may reside completely, or at least partially, within the main memory 108, the static memory 110, and/or within the disk drive 122 during execution by the hardware processor 102, EC 104, or GPU 106 of information handling system 100.

Main memory 108 or other memory of the embodiments described herein may contain computer-readable medium (not shown), such as RAM in an example embodiment. An example of main memory 108 includes random access memory (RAM) such as static RAM (SRAM), dynamic RAM (DRAM), non-volatile RAM (NV-RAM), or the like, read only memory (ROM), another type of memory, or a combination thereof. Static memory 110 may contain computer-readable medium (not shown), such as NOR or NAND flash memory in some example embodiments. The applications and associated APIs, for example, may be stored in static memory 110 or on the disk drive unit 122 that may include access to a machine-readable code instructions, parameters, and profiles 114 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 124 (a.k.a. a power supply unit (PSU)). The PMU 124 may include a hardware controller and executable machine-readable code instructions to manage the power provided to the components of the information handling system 100 such as the hardware processor 102 and other hardware components described herein. The PMU 124 may control power to one or more components including the one or more drive units 122, the hardware processor 102 (e.g., CPU), the EC 104, the GPU 106, a video/graphic display device 146, or other wired I/O devices 144 such as the mouse 154, the stylus 150, the keyboard 148, and the trackpad 152 and other components that may require power when a power button has been actuated by a user. In an embodiment, the PMU 124 may monitor power levels and be electrically coupled to the information handling system 100 to provide this power. The PMU 124 may be coupled to the bus 120 to provide or receive data or machine-readable code instructions. The PMU 124 may regulate power from a power source such as the battery 126 or AC power adapter 128. In an embodiment, the battery 126 may be charged via the AC power adapter 128 and provide power to the components of the information handling system 100, via wired connections as applicable, or when AC power from the AC power adapter 128 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 may be paired with and operatively coupled to a wireless peripheral device 156. The wireless peripheral device 156 may be any type of peripheral device and may include a wireless mouse 154, a wireless stylus 150, a wireless keyboard 148, a wireless video display device 146, among other wireless peripheral devices. The wireless peripheral device 156 may include a wireless peripheral device hardware microcontroller 158 to execute computer-readable program code instructions described herein. Additionally, the wireless peripheral device 156 includes a peripheral device power management unit (PMU) 180. The peripheral device PMU 180 may include a hardware controller and executable machine-readable code instructions to manage the power provided to the components of the wireless peripheral device 156 such as the wireless peripheral device radio 184, the peripheral device storage device 160, and the peripheral device microcontroller 158 as well as other hardware components described herein. In an embodiment, the peripheral device PMU 180 may monitor power levels and be electrically coupled to the wireless peripheral device 156 to provide this power. The peripheral device PMU 180 may regulate power from a power source such as a wireless peripheral device battery 182.

In an embodiment, the wireless peripheral device 156 is operatively coupled to the information handling system 100, at least initially, via a dongle 190. In an embodiment, as power is provided to the wireless peripheral device hardware microcontroller 158 and wireless peripheral device radio 184 by operation of the peripheral device PMU 180, the wireless peripheral device 156 may transceive data to and from the information handling system 100 via the wireless peripheral device RF front end 186 and wireless peripheral device antenna 188. Additionally, in order to transceive data to and from the wireless peripheral device 156, the dongle 190 also includes a built-in dongle radio 192, dongle RF front end 194, and dongle antenna 196 which may also power from the information handling system, such as via a universal serial bus (USB) port coupling. As such, as the wireless peripheral device 156 is initiated and the dongle 190 has been inserted into, for example, a USB port of the information handling system 100, the wireless peripheral device 156 may communicate with the information handling system 100. It is appreciated that the wireless peripheral device 156 may communicate wirelessly with the dongle 190 using any radio frequency including 2.4 GHz and 5 GHz frequency bands. In an embodiment, the wireless protocol used to operatively couple the dongle 190 to the wireless peripheral device may be the proprietary wireless protocol involving proprietary modulation, functions, and wireless data transmission capabilities. In an embodiment, the dongle 190 may be preprogrammed with pairing authentication data that is used to automatically wirelessly pair and bond the dongle 190 with the wireless peripheral device 156.

As described herein, as the wireless peripheral device 156 is operatively coupled to the information handling system 100 via the dongle 190, the wireless peripheral device hardware microcontroller 158 may execute computer-readable program code instructions of a silent virtual slot provisioning module 162 to request, automatically, Bluetooth® (BT) pairing pre-authorization data from the information handling system 100 on top of or in addition to the proprietary RF protocol pairing via the dongle. In an embodiment, this BT pairing pre-authorization data may include a BT address of the information handling system, a pairing passcode seed, a session identification value, and a time stamp. In an embodiment, the pairing passcode seed, session identification value, and time stamp may be generated by the hardware processor 102 at the information handling system 100. Alternatively, the pairing passcode seed, session identification value, and time stamp may be generated by the wireless peripheral device hardware microcontroller 158 at the wireless peripheral device 156. In an embodiment, a seed generator 166-1, 166-2 at either of the information handling system 100 or wireless peripheral device 156 may be used to generate the pairing passcode seed. In an embodiment, a timeblock 168-1, 168-2 at either of the information handling system 100 or wireless peripheral device 156 may be used to generate the time stamp.

After the BT pairing pre-authorization data has been exchanged via the dongle 190 to and from the wireless peripheral device 156 and information handling system 100, each of the hardware processor 102 and wireless peripheral device hardware microcontroller 158 may execute computer-readable program code instructions of a one-time password (OTP) algorithm 164-1, 164-2. In an embodiment, this OTP algorithm 164-1, 164-2 may concatenate the pairing passcode seed, the time stamp, and the session identification value in order to generate a set of BT pairing data. It is appreciated that because the hardware processor 102 of the information handling system 100 and the wireless peripheral device hardware microcontroller 158 of the wireless peripheral device 156 are executing the same OTP algorithm 164-1, 164-2, each of the wireless peripheral device 156 and information handling system 100 generate the same BT pairing data used to subsequently pair and bond the wireless peripheral device 156 to the information handling system 100 using a BT pairing process.

In an embodiment, the wireless peripheral device hardware microcontroller 158 executes the computer-readable program code of the silent virtual slot provisioning module 162 to map the generated BT pairing data to a first virtual pairing slot 170 associated with at least one of a first manual pairing channel 178-1, a second manual pairing channel 178-2, or any nth manual pairing channel **178-*n* defined by the wireless peripheral device hardware microcontroller 158 in the wireless peripheral device 156. In an example embodiment, the wireless peripheral device 156 includes a manual channel selection button (shown in FIG. 3 below) formed on the housing of the wireless peripheral device 156. This manual channel selection button allows the user to toggle through the first manual pairing channel 178-1, the second manual pairing channel 178-2, and any nth manual pairing channel 178-*n* each time the user actuates the manual channel selection button. As such, the first manual pairing channel 178-1 may be selected by the user to cause the wireless peripheral device 156 to communicate with the information handling system 100 via the dongle 190 using a first wireless communication protocol at a specific radio frequency. Similarly, the selection of the second manual pairing channel 178-2 by the user causes the wireless peripheral device 156 to communicate with the information handling system 100 without using the dongle 190 while using a second wireless communication protocol such as a BT or Bluetooth® Low Energy (BLE) communication protocol at another specific radio frequency. Any other nth manual pairing channel 178-*n* may also be selected by a user to cause the wireless peripheral device 156 to communicate with the information handling system 100 without using the dongle 190 while using a third wireless communication protocol at yet another specific radio frequency. It is appreciated that, in some embodiments, the differences between the wireless protocols used at the first manual pairing channel 178-1 and the second manual pairing channel 178-2/nth manual pairing channel 178-*n* are a result of the first manual pairing channel 178-1 using the dongle 190 to communicate with the information handling system 100**.

The mapping of the BT pairing data to a virtual slot associated with the first manual pairing channel 178-1 allows the wireless peripheral device 156 to alternatively communicate with the information handling system 100 without the use of the dongle 190 while using the first manual pairing channel 178-1. This allows the wireless peripheral device 156 to automatically switch from a communication with the information handling system 100 using the first (e.g., proprietary RF) communication protocol via the dongle 190 to communicating with the information handling system 100 using another wireless protocol such as a BT or BLE communication protocol.

By way of example, the dongle 190 may be operatively coupled to a USB port of a docking station (shown below in FIG. 2) associated with the information handling system 100. As the information handling system 100 is operatively coupled to the docking station, the wireless peripheral device 156, via the dongle 190, may communicate with the information handling system 100 using the first communication protocol that may be the proprietary RF protocol due to the dongle 190 acting as an intermediary communication device. However, in instances where the user, even temporarily, leaves the docking station and dongle 190 by physically carrying away the wireless peripheral device 156 and information handling system 100, the dongle 190 is no longer available to act as this intermediary communication device. In this instance, the wireless peripheral device hardware microcontroller 158 may detect that the dongle 190 is no longer available to use as this intermediary communication device and may access the BT pairing data preauthorized at the first virtual pairing slot 170, and utilizing the manual pairing channel 178-1, generated earlier to establish at BT or BLE wireless connection with the information handling system 100. This allows the user to still operate the wireless peripheral device 156 with the information handling system 100 even where the dongle 190 is no longer available. This further allows the user to not have the dongle 190 occupy a USB port at the information handling system 100 and still have the wireless peripheral device 156 operate as an input device when the dongle 190 at the docking station is not available. As a consequence, the USB port at the information handling system 100 that would have otherwise been occupied by the dongle 190 is now free to be used by another peripheral device while the dongle 190 remains at the USB port of the docking station.

It is appreciated that any number of virtual pairing slots 170, 174 may be defined by the wireless peripheral device hardware microcontroller 158 and associated with the first manual pairing channel 178-1 or any other manual pairing channel (e.g., 178-2, **178-*n*) of the wireless peripheral device 156. Indeed, with a first virtual pairing slot 170 and a second virtual pairing slot 174, each may include first BT pairing data 172 and second BT pairing data 176, respectively, that allow the wireless peripheral device 156 to operate with two different information handling systems 100. In an example embodiment, a user may own a first information handling system 100 as a gaming information handling system and a second information handling system (not shown) as an information handling system dedicated to work or other activities. During operation, the user may insert the dongle 190 into a USB port of the first information handling system 100 and allow the wireless peripheral device hardware microcontroller 158 to execute the computer-readable program code of the silent virtual slot provisioning module 162 to generate the first BT pairing data 172 as described herein. This first BT pairing data 172 is associated with the first virtual pairing slot 170 defined by the wireless peripheral device hardware microcontroller 158 of the wireless peripheral device 156. The user may then remove the dongle 190** from the USB port of the first information handling system

100 and insert the dongle 190 into a USB port of a second information handling system (not shown). Again, the execution of the silent virtual slot provisioning module 162 by the wireless peripheral device hardware microcontroller 158 causes second BT pairing data 176 to be generated and saved or otherwise associated with a second virtual pairing slot 174 of the first manual pairing channel 178-1. Under this configuration, the wireless peripheral device 156 may be used to operate with the first information handling system 100 and the second information handling system without the user having to actuate or otherwise engage with the manual channel selection button formed on the housing of the wireless peripheral device 156. In a specific use-case, the user may take the wireless peripheral device 156 to an office or other working location (with or without the dongle 190) to engage with the first information handling system 100 at that location and then take the wireless peripheral device 156 home or other location with the user and engage with the second information handling system (with or without the dongle 190) without having to change physical manual pairing channels on the wireless peripheral device 156.

It is appreciated that any number of virtual pairing slots 170, 174 may be created by the wireless peripheral device hardware microcontroller 158 and associated with the first manual pairing channel 178-1 or other manual pairing channels 178-2 to **178-*n* according to various embodiments herein. In a specific embodiment, the number of virtual pairing slots 170, 174 may be limited to two on a manual pairing channel such as 178-1 as shown in FIG. 1. It is appreciated that where a user wishes to use the wireless peripheral device 156 with a third information handling system (not shown), the user may actuate the manual channel selection button to allow communication between the wireless peripheral device 156 and the third information handling system via a BT or BLE wireless communication protocol or some other wireless communication protocol. However, in an embodiment, where the dongle 190 is placed within a USB port of the third information handling system, the wireless peripheral device hardware microcontroller 158 may recognize that the first virtual pairing slot 170 and second virtual pairing slot 174 have already been mapped with respective preauthorized first BT pairing data 172 and second BT pairing data 176 as described herein. In an embodiment, the provisioning of any BT pairing data into any of the first virtual pairing slot 170 and second virtual pairing slot 174 may allow for the overwriting of the first BT pairing data 172 and/or second BT pairing data 176 when a new set of preauthorized BT pairing data (not shown) is to be associated with an of the first virtual pairing slot 170 or second virtual pairing slot 174. In an embodiment where all of the first virtual pairing slot 170 and second virtual pairing slot 174, or others are provisioned with preauthorized BT pairing data already, the wireless peripheral device hardware microcontroller 158 may select one of the first BT pairing data 172 and second BT pairing data 176 to be overwritten using, for example, a first-in, first-out overwriting process. This means that whichever of the preauthorized first BT pairing data 172 or second BT pairing data 176 was first written to the first virtual pairing slot 170 or second virtual pairing slot 174 will be overwritten when this new BT pairing data is to be generated and associated with either of the first virtual pairing slot 170 or second virtual pairing slot 174. This allows a user to, for example, switch from an old or outdated information handling system to a new or updated information handling system such that the user need only insert the dongle 190** into a USB port of the new information handling system in order to overwrite any BT pairing data associated with the older information handling system.

In an embodiment, the execution of a BT or BLE pairing by the wireless peripheral device hardware microcontroller 158 may start when no dongle 190 is initially detected as communicating between the wireless peripheral device 156 and information handling system 100 during a first pairing of the wireless peripheral device 156 to any information handling system 100. For example, a minimal touch pairing mechanism using pre-loaded BT pairing credentials, seed values or the like, such as a Dell Pair system, may be executing between the wireless peripheral device 256 and either of the information handling system 100. an embodiment, if the BT or BLE pairing process is started and the preauthorized BT pairing data has been generated as described herein, a later insertion of the dongle 190 in a USB port of the information handling system 100 or a docking station causes the wireless peripheral device hardware microcontroller 158 to copy the BT pairing data into the first virtual pairing slot 170 and be saved as the first BT pairing data 172 for preauthorized BT pairing when dongle 190 is removed. Thus, the provisioning of the first BT pairing data 172 for preauthorized BT pairing into the first virtual pairing slot 170 may occur when the dongle 190 is detected, but may be started before a dongle 190 has been inserted in some embodiments.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

FIG. 2 is a graphic and block diagram illustrating an information handling system 200 that may be operatively coupled to a wireless peripheral device 256 that includes silent virtual slot provisioning to pair a plurality of information handling systems to the same manual pairing channel 278-1, 278-1, **278-*n* according to another embodiment of the present disclosure. FIG. 2 shows that the wireless peripheral device 256 is a wireless mouse such as a wireless mouse similar to that shown in FIG. 1. However, the present specification contemplates that the wireless peripheral device 256 may be any type of peripheral device such as a wireless stylus, a wireless keyboard, a wireless video display device, among other wireless peripheral devices. Additionally, FIG. 2 shows a first information handling system 200-1 and a second information handling system 200-2 that each may be operatively coupled to the wireless peripheral device 256 as described herein. Each of the first information handling system 200-1 and second information handling system 200-2 includes a built-in video display device 246-1, 246-2, a built-in keyboard 248-1, 248-2, and a built-in trackpad 252-1, 252-1. Other types of information handling systems, such as tablets, all-in-one systems, and others, are contemplated for wireless pairing with the wireless peripheral device 256 in other embodiments. Additionally, each of the first information handling system 200-1 and second information handling system 200-2 includes a hardware processor 202-1, 202-2 and machine-readable code instructions 214-1, 214-2** to execute the computer-readable program code instructions described herein.

The wireless peripheral device 256 may include a wireless peripheral device hardware microcontroller 258 to execute computer-readable program code instructions described herein. Additionally, the wireless peripheral device 256 includes a peripheral device power management unit (PMU) 280. The peripheral device PMU 280 may include a hardware controller and executable machine-readable code instructions to manage the power provided to the components of the wireless peripheral device 256 such as the wireless peripheral device radio 284, the peripheral device storage device 260, and the peripheral device microcontroller 258 as well as other hardware components described herein. In an embodiment, the peripheral device PMU 280 may monitor power levels and be electrically coupled to the wireless peripheral device 256 to provide this power. The peripheral device PMU 280 may regulate power from a power source such as a wireless peripheral device battery 282.

In an embodiment, the wireless peripheral device 256 is operatively coupled to the first information handling system 200-1, at least initially, via a dongle 290. In an embodiment, as power is provided to the wireless peripheral device hardware microcontroller 258 and wireless peripheral device radio 284 by operation of the peripheral device PMU 280, the wireless peripheral device 256 may have an additional capacity to wirelessly transceive data to and from the first information handling system 200-1 via the wireless peripheral device RF front end 286 and wireless peripheral device antenna 288. Additionally, in order to transceive data to and from the wireless peripheral device 256, the dongle 290 also includes a built-in dongle radio 292, dongle RF front end 294, and dongle antenna 296. As such, as the wireless peripheral device 256 is initiated and the dongle 290 has been inserted into, for example, a USB port of the first information handling system 200-1, the wireless peripheral device 256 may communicate with the first information handling system 200-1. It is appreciated that the wireless peripheral device 256 may communicate wirelessly with the dongle 290 using any radio frequency including 2.4 GHz and 5 GHz frequency bands. In an embodiment, the wireless protocol used to operatively couple the dongle 290 to the wireless peripheral device may be a proprietary RF wireless protocol including proprietary wireless modulation and having proprietary capabilities or methods for wireless transmission and reception of data. Additionally, the proprietary RF protocol may include proprietary methods of pairing, including supported pre-authorized pairing between the dongle 290 and the wireless peripheral device 256 it came with. Thus, in an embodiment, the dongle 290 may be preprogrammed with pairing authentication data that is used to automatically wirelessly pair and bond the dongle 290 with the wireless peripheral device 256.

As described herein, when the wireless peripheral device 256 is operatively coupled to the first information handling system 200-1 via the dongle 290, the wireless peripheral device hardware microcontroller 258 may execute computer-readable program code instructions of the silent virtual slot provisioning module 262 to request, automatically, Bluetooth® or Bluetooth® Low Energy (BLE) pairing (BT pairing) pre-authorization data from the first information handling system 200-1 via the dongle 290 and proprietary RF protocol. In an embodiment, this BT pairing pre-authorization data may include a BT address of the first information handling system 200-1, a pairing passcode seed, a session identification value, and a time stamp. In an embodiment, the pairing passcode seed, session identification value, and time stamp may be generated by the hardware processor 202-1 at the first information handling system 200-1. Alternatively, the pairing passcode seed, session identification value, and time stamp may be generated by the wireless peripheral device hardware microcontroller 258 at the wireless peripheral device 256. In an embodiment, a seed generator 266-1, 266-2 at either of the first information handling system 200-1 or wireless peripheral device 256 may be used to generate the pairing passcode seed. In an embodiment, a timeblock 268-1, 268-2 at either of the first information handling system 200-1 or wireless peripheral device 256 may be used to generate the time stamp.

After the BT pairing pre-authorization data has been exchanged via the dongle 290 to and from the wireless peripheral device 256 and first information handling system 200-1, each of the hardware processor 202-1 and wireless peripheral device hardware microcontroller 258 may execute computer-readable program code instructions of the OTP algorithm 264-1, 264-2. In an embodiment, this OTP algorithm 264-1, 264-2 may concatenate the pairing passcode seed, the time stamp, and the session identification value in order to generate a set of preauthorized BT pairing data. It is appreciated that because the hardware processor 202-1 of the first information handling system 200-1 and the wireless peripheral device hardware microcontroller 258 of the wireless peripheral device 256 are executing the same OTP algorithm 264-1, 264-2, each of the wireless peripheral device 256 and first information handling system 200-1 generate the same preauthorized BT pairing data used to subsequently pair and bond the wireless peripheral device 256 to the first information handling system 200-1 using a BT pairing process.

In an embodiment, the wireless peripheral device hardware microcontroller 258 executes the computer-readable program code of the silent virtual slot provisioning module 262 to map the generated preauthorized BT pairing data to the first virtual pairing slot 270 associated with at least one of a first manual pairing channel 278-1, a second manual pairing channel 278-2, or any nth manual pairing channel **278-*n* defined by the wireless peripheral device hardware microcontroller 258 in the wireless peripheral device 256**.

In an example embodiment, the wireless peripheral device 256 includes a manual channel selection button formed on the housing of the wireless peripheral device 256 and shown below in FIG. 3. This manual channel selection button allows the user to toggle through the first manual pairing channel 278-1, the second manual pairing channel 278-2, and any nth manual pairing channel 278-*n* each time the user actuates the manual channel selection button. As such, the first manual pairing channel 278-1 may be selected by the user to cause the wireless peripheral device 256 to communicate with the first information handling system 200-1 via the dongle 290 using a first wireless communication protocol at a specific radio frequency that is the proprietary RF protocol in an embodiment. In embodiments herein, the proprietary RF protocol may operate in the same or similar frequency bands as BT and BLE protocols. Similarly, the selection of the second manual pairing channel 278-2 by the user causes the wireless peripheral device 256 to communicate with the first information handling system 200-1 without using the dongle 290 while using a second wireless communication protocol such as a BT or BLE communication protocol at another specific radio frequency. Any other nth manual pairing channel 278-*n* may also be selected by a user to cause the wireless peripheral device 256 to communicate with the first information handling system 200-1 without using the dongle 290 while using a third wireless communication protocol at yet another specific radio frequency. It is appreciated that, in some embodiments, the differences between the wireless protocols used at the first manual pairing channel 278-1 and the second manual pairing channel 278-2/nth manual pairing channel 278-*n* are a result of the first manual pairing channel 278-1 using the dongle 290 to communicate with the first information handling system 200-1 at certain times.

The mapping of the BT pairing data to a virtual slot associated with the first manual pairing channel 278-1 allows the wireless peripheral device 256 to alternatively communicate with the first information handling system 200-1 without the use of the dongle 290. This allows the wireless peripheral device 256 to automatically switch from a communication with the first information handling system 200-1 using the first (e.g., proprietary RF) communication protocol via the dongle 290 to communicating with the first information handling system 200-1 using another wireless protocol such as a BT or BLE communication protocol that has been preauthorized.

By way of example, the dongle 290 may be operatively coupled to a USB port of a docking station 291 associated with the first information handling system 200-1. When the first information handling system 200-1 is operatively coupled to the docking station 291, the wireless peripheral device 256, via the dongle 290, may communicate with the first information handling system 200-1 using the first communication protocol that may be the proprietary RF protocol due to the dongle 290 acting as an intermediary communication device. However, in instances where the user, even temporarily, leaves the docking station 291 and dongle 290 by physically carrying away the wireless peripheral device 256 and first information handling system 200-1, the dongle 290 is no longer available to act as this intermediary communication device. In this instance, the wireless peripheral device hardware microcontroller 258 may detect that the dongle 290 is no longer available to use as this intermediary communication device and may access the BT pairing data preauthorized at the first virtual pairing slot 270, and utilizing the manual pairing channel 178-1, generated earlier to establish at BT or BLE wireless connection with the first information handling system 200-1. This allows the user to still operate the wireless peripheral device 256 with the first information handling system 200-1 even where the dongle 290 is no longer available. This further allows the user to not have the dongle 290 occupy a USB port at the first information handling system 200-1 and still have the wireless peripheral device 256 operate as an input device when the dongle 290 at the docking station is not available. As a consequence, the USB port at the first information handling system 200-1 that would have otherwise been occupied by the dongle 290 is now free to be used by another peripheral device while the dongle 290 remains at the USB port of the docking station.

It is appreciated that any number of virtual pairing slots 270, 274 may be defined by the wireless peripheral device hardware microcontroller 258 and associated with the first manual pairing channel 278-1 or any other manual pairing channel (e.g., 278-2, 278-*n*) of the wireless peripheral device 256. Indeed, with a first virtual pairing slot 270 and a second virtual pairing slot 274, each may include preauthorized first BT pairing data 272 and second BT pairing data 276, respectively, that allow the wireless peripheral device 256 to operate with two different information handling systems 200-1, 200-2 that includes the first information handling system 200-1 and second information handling system 200-2 shown in FIG. 2. In an example embodiment, a user may own the first information handling system 200-1 operating as a gaming information handling system and a second information handling system 200-2 operating as an information handling system dedicated to work or other activities. During operation, the user may insert the dongle 290 into a USB port of the first information handling system 200-1 or a docking station 291 operatively coupled to the first information handling system 200-1 and allow the wireless peripheral device hardware microcontroller 258 to execute the computer-readable program code of the silent virtual slot provisioning module 262 to generate the first BT pairing data 272 as described herein. This preauthorized first BT pairing data 272 is associated with the first virtual pairing slot 270 defined by the wireless peripheral device hardware microcontroller 258 of the wireless peripheral device 256. The user may then remove the dongle 290 from the USB port of the first information handling system 200-1 and insert the dongle 290 into a USB port of the second information handling system 200-2 or operatively couple the second information handling system 200-2 to docking station 291 in some embodiments. Again, the execution of the silent virtual slot provisioning module 262 by the wireless peripheral device hardware microcontroller 258 causes preauthorized second BT pairing data 276 to be generated and saved or otherwise associated with a second virtual pairing slot 274 of the first manual pairing channel 278-1. Under this configuration, the wireless peripheral device 256 may be used to operate with the first information handling system 200-1 and the second information handling system 200-2 without the user having to actuate or otherwise engage with the manual channel selection button formed on the housing of the wireless peripheral device 256 as between an RF protocol using the dongle 290 when present or BT or BLE wireless links. In a specific use-case, the user may take the wireless peripheral device 256 to an office or other working location (with or without the dongle 290) engage with the first information handling system 200-1 at that location and then take the wireless peripheral device 256 home or other location with the user and engage with the second information handling system 200-2 (with or without the dongle 290) without having to change physical manual pairing channels on the wireless peripheral device 256.

It is appreciated that any number of virtual pairing slots 270, 274 may be created by the wireless peripheral device hardware microcontroller 258 and associated with the first manual pairing channel 278-1. In a specific embodiment, the number of virtual pairing slots 270, 274 may be limited to two as shown in FIG. 2. It is appreciated that where a user wishes to use the wireless peripheral device 256 with a third information handling system (not shown), the user may actuate the manual channel selection button for another manual pairing channel, such as 278-2 or **278-*n*, to allow communication between the wireless peripheral device 256 and the third information handling system via a BT or BLE wireless communication protocol or some other wireless communication protocol. However, in an embodiment, where the dongle 290 is placed within a USB port of the third information handling system, the wireless peripheral device hardware microcontroller 258 may recognize that the first virtual pairing slot 270 and second virtual pairing slot 274 have already been mapped with respective first BT pairing data 272 and second BT pairing data 276 as described herein. In an embodiment, the provisioning of any BT pairing data into any of the first virtual pairing slot 270 and second virtual pairing slot 274 may allow for the overwriting of the first BT pairing data 272 and/or second BT pairing data 276 when a new set of preauthorized BT pairing data (not shown) is to be associated with an of the first virtual pairing slot 270 or second virtual pairing slot 274. In an embodiment where all of the first virtual pairing slot 270 and second virtual pairing slot 274 are provisioned with BT pairing data already, the wireless peripheral device hardware microcontroller 258 may select one of the first BT pairing data 272 and second BT pairing data 276 to be overwritten using, for example, a first-in, first-out overwriting process. This means that whichever of the first BT pairing data 272 or second BT pairing data 276 was first written to the first virtual pairing slot 270 or second virtual pairing slot 274 will be overwritten when this new BT pairing data is to be generated for preauthorized BT pairing and operative coupling and associated with either of the first virtual pairing slot 270 or second virtual pairing slot 274. This allows a user to, for example, switch from an old or outdated information handling system to a new or updated information handling system such that the user need only insert the dongle 290** into a USB port of the new information handling system in order to overwrite any BT pairing data associated with the older information handling system.

In an embodiment, the execution of a BT or BLE pairing by the wireless peripheral device hardware microcontroller 258 may be started when no dongle 290 is detected as communicating between the wireless peripheral device 256 and either of the first information handling system 200-1 and second information handling system 200-2. For example, a minimal touch pairing mechanism using pre-loaded BT pairing credentials, seed values or the like, such as a Dell Pair system, may be executing between the wireless peripheral device 256 and either of the first information handling system 200-1 or second information handling system 200-2. In an embodiment, if the BT or BLE pairing process is started and the BT pairing data has been generated or exchanged for BT or BLE pairing authorization as described herein, a later insertion of the dongle 290 in a USB port of the first information handling system 200-1, second information handling system 200-2, or docking station 291 causes the wireless peripheral device hardware microcontroller 258 to copy the BT pairing data into the first virtual pairing slot 270 to be saved as the preauthorized first BT pairing data 272 due to a dongle 290 priority policy to use the dongle 290 and proprietary RF protocol. Thus, the provisioning of the first BT pairing data 272 for preauthorized BT pairing into the first virtual pairing slot 270 may occur when the dongle 290 is detected, but may be started before a dongle 290 has been inserted in some embodiments.

Figure 3:
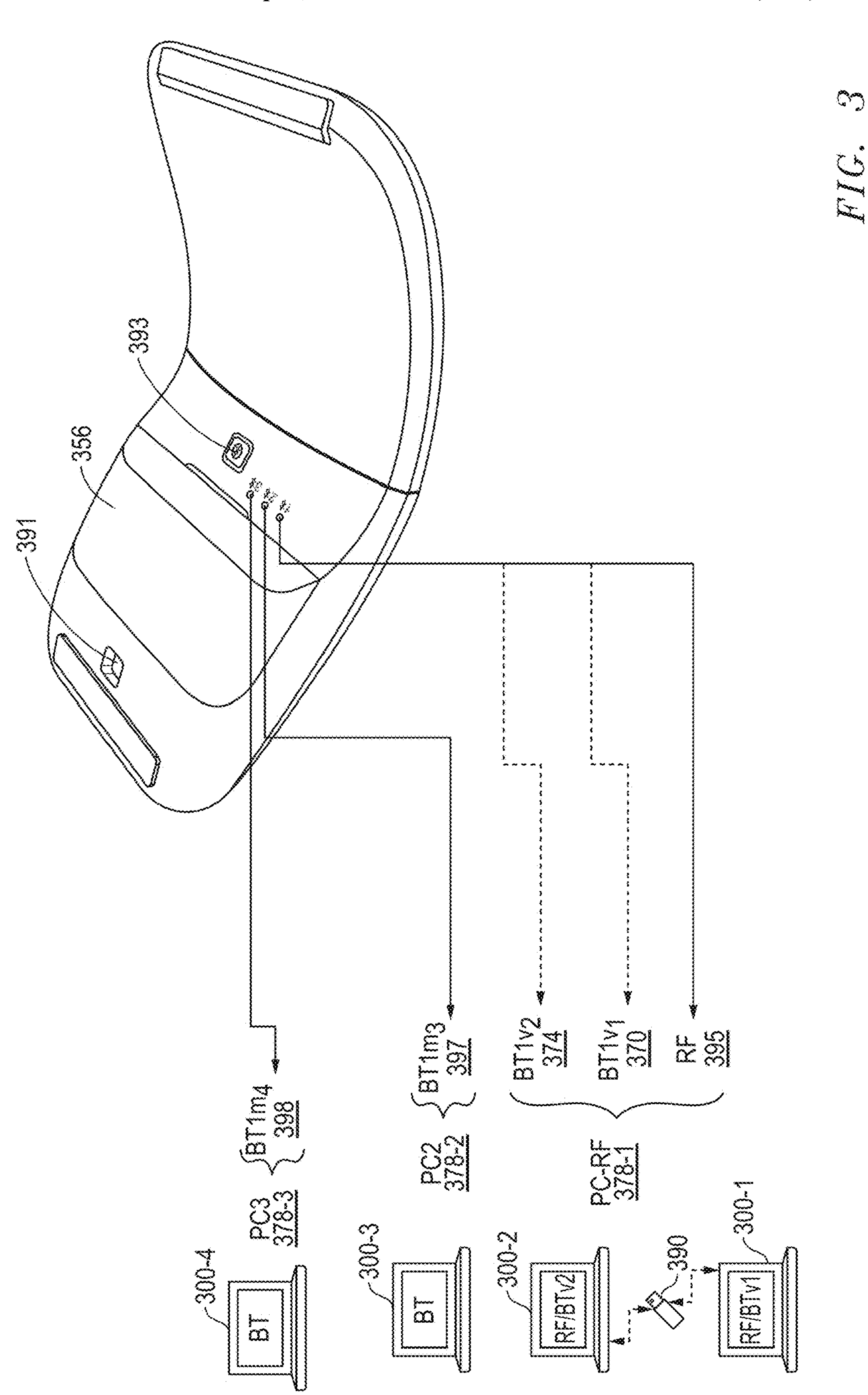
FIG. 3 is a graphic diagram of a wireless peripheral device having a plurality of manual pairing channels to which a plurality of silent virtual slots may be provisioned, and a plurality of information handling systems may be operatively coupled to according to an embodiment of the present disclosure.

FIG. 3 is a graphic of a wireless peripheral device 356 having a plurality of manual pairing channels 378-1, 378-2, 378-3 to which a plurality of virtual slots 370, 374 may be provisioned and to which a plurality of information handling systems 300-1, 300-2, 300-3, 300-4 may be operatively coupled to according to an embodiment of the present disclosure. FIG. 3 shows that the wireless peripheral device 356 is a wireless mouse (turned upside down in the image shown) such as a wireless mouse similar to that shown in FIGS. 1 and 2. However, the present specification contemplates that the wireless peripheral device 356 may be any type of peripheral device such as a wireless stylus, a wireless keyboard, a wireless video display device, among other wireless peripheral devices.

In the embodiment shown in FIG. 3, the wireless peripheral device 356 is a wireless mouse with a LED/laser optical detector system 391. The LED/laser optical detector system 391 is used to detect when the wireless mouse is moved. It is appreciated that this example wireless mouse is used as an example of the wireless peripheral device 356 may also include any number of input devices such as buttons (not shown), scrolling wheels (not shown), and other input devices that allow a user to provide input to an information handling system 300-1, 300-2, 300-3, 300-4 as described herein.

The wireless peripheral device 356 also includes a manual channel selection button 393. The manual channel selection button 393 allows a user to toggle between a first manual pairing channel 378-1 (e.g., a radio frequency (RF) protocol manual pairing channel), a second manual pairing channel 378-2 (e.g., $BT1m_3$), and a third manual pairing channel 378-3 (e.g., $BT1m_4$). It is appreciated that although three manual pairing channels 378-1, 378-2, 378-3 are shown in FIG. 3, the wireless peripheral device 356 may include any number of manual pairing channels 378-1, 378-2, 378-3 and the present specification contemplates that more or fewer manual pairing channels 378-1, 378-2, 378-3 may be provisioned at the wireless peripheral device 356 for the user to toggle between.

As described herein, the manual pairing channels 378-1, 378-2, 378-3 allow a user to pair the wireless peripheral device 356 to multiple information handling systems 300-1, 300-2, 300-3, 300-4. As described herein, the wireless peripheral device hardware microcontroller (not shown) of the wireless peripheral device 356 executes the computer-readable program code of the silent virtual slot provisioning module described herein that maps the generated BT pairing data to a first virtual pairing slot 370 (e.g., $BTV_1$) associated with at least one of a first manual pairing channel 378-1 (as shown) or a second manual pairing channel 378-2, a third manual pairing channel 378-3, or any nth manual pairing channel defined by the wireless peripheral device hardware microcontroller in the wireless peripheral device 356. FIG. 3 shows that the first virtual pairing slot 370 and second virtual pairing slot 374 (e.g., $BT1v_2$) are associated with the first manual pairing channel 387-1 that is used to communicate with the first information handling system 300-1 or second information handling system 300-2 via the dongle 390 using a first wireless communication protocol at a specific radio frequency, such as with a proprietary RF protocol as described herein. In an embodiment, this first wireless communication protocol may be proprietary to the manufacturer of the dongle 390 and wireless peripheral device 356 and provide for proprietary modulation, wireless data transfer, pairing techniques and other characteristics for the proprietary RF protocol. In an embodiment, the dongle 390 and/or wireless peripheral device 356 may be preprogrammed with pairing authentication data for the proprietary RF protocol such that as the user operatively couples the dongle 390 to the first information handling system 300-1 and/or second information handling system 300-2 the wireless peripheral device 356 is automatically paired with the first information handling system 300-1 and/or second information handling system 300-2 with little or no interaction or additional steps to be performed by the user.

In an embodiment, the selection of the second manual pairing channel 378-2 by the user causes the wireless peripheral device 356 to communicate with the third information handling system 300-3 without using the dongle 390 while using a second wireless communication protocol such as a BT or Bluetooth® Low Energy (BLE) communication protocol or other communication protocol at another specific radio frequency. Similarly, the third manual pairing channel 378-3 may also be selected by a user to cause the wireless peripheral device 356 to communicate with the fourth information handling system 300-4 without using the dongle 390 while using a third wireless communication protocol at yet another specific radio frequency. It is appreciated that, in some embodiments, the differences between the wireless protocols used at the first manual pairing channel 378-1 and the second manual pairing channel 378-2/third manual pairing channel 378-3 are a result of the first manual pairing channel 378-1 using the dongle 390 to communicate with the information handling systems 300-1, 300-2, 300-3, 300-4.

The mapping of the preauthorized BT pairing data to a virtual slot 370, 374 associated with the first manual pairing channel 378-1 allows the wireless peripheral device 356 to alternatively communicate with the first information handling system 300-1 without the use of the dongle 390 as well. This allows the wireless peripheral device 356 to automatically switch from a communication with the first information handling system 300-1 using the first (e.g., proprietary) communication protocol via the dongle 390 to communicating with the first information handling system 300-1 using another wireless protocol such as a BT or BLE communication protocol.

By way of example, the dongle 390 may be operatively coupled to a USB port of a docking station associated with the first information handling system 300-1. As the first information handling system 300-1 is operatively coupled to the docking station, the wireless peripheral device 356, via the dongle 390, may communicate with the first information handling system 300-1 using the first communication protocol that may be the proprietary RF protocol discussed in embodiments herein due to the dongle 390 acting as an intermediary communication device. In such a case, the dongle 390 and the proprietary RF protocol have a priority over other wireless protocols as it is assumed that use of the dongle 390 indicates a user preference for the RF protocol. Moreover, the proprietary RF protocol may have additional RF features and capabilities, such as gaming focused enhancements or other enhancements, which may make use of the RF dongle 390 more stable and desirable in some embodiments. However, in instances where the user, even temporarily, leaves the docking station and dongle 390 by physically carrying away the wireless peripheral device 356 and first information handling system 300-1, the dongle 390 is no longer available to act as this intermediary communication device. In this instance, the wireless peripheral device hardware microcontroller may detect that the dongle 390 is no longer available to use as this intermediary communication device and may access the preauthorized BT pairing data at the first virtual pairing slot 370 generated earlier to establish at BT or BLE wireless connection with the first information handling system 300-1. This allows the user to still operate the wireless peripheral device 356 with the first information handling system 300-1 even where the dongle 390 is no longer available. This further allows the user to not have the dongle 390 occupy a USB port at the first information handling system 300-1 and still have the wireless peripheral device 356 operate as an input device when the dongle 390 at the docking station is not available in some example embodiments. As a consequence, the USB port at the first information handling system 300-1 that would have otherwise been occupied by the dongle 390 is now free to be used by another peripheral device while the dongle 390 remains at the USB port of the docking station.

It is appreciated that any number of virtual pairing slots 370, 374 may be defined by the wireless peripheral device hardware microcontroller and associated with the first manual pairing channel 378-1 or any other manual pairing channel (e.g., 378-2, 378-3) of the wireless peripheral device 356. Indeed, with a first virtual pairing slot 370 and a second virtual pairing slot 374, each may include preauthorized first BT pairing data and second BT pairing data, respectively, that allow the wireless peripheral device 356 to operate with two different information handling systems such as the first information handling system 300-1 and the second information handling system 300-2. In an example embodiment, a user may own the first information handling system 300-1 and operate it as a gaming information handling system. The user may also own a second information handling system 300-2 and operate that as an information handling system dedicated to work or other activities. During operation of the systems and methods described herein, the user may insert the dongle 390 into a USB port of the first information handling system 300-1 and allow the wireless peripheral device hardware microcontroller to execute the computer-readable program code of the silent virtual slot provisioning module to generate the first BT pairing data as described herein. The dongle 390 and proprietary RF protocol will take priority when installed, however other times the dongle 390 may not be present. This first BT pairing data is associated with the first virtual pairing slot 370 defined by the wireless peripheral device hardware microcontroller of the wireless peripheral device 356 for BT or BLE pairing with the first information handling system 300-1.

The user may then remove the dongle 390 from the USB port of the first information handling system 300-1. Upon inserting the dongle 390 into a USB port of the second information handling system 300-2, dongle 390 and proprietary RF protocol will take priority when installed for wireless data communication from the wireless peripheral device 356 to the second information handling system 300-2 when the dongle 390 is installed. However, if the dongle is removed, a switchover to a BT or BLE wireless link may be desirable with the second information handling system 300-2. Again, the execution of the silent virtual slot provisioning module by the wireless peripheral device hardware microcontroller causes preauthorization second BT pairing data to be generated and saved or otherwise associated with a second virtual pairing slot 374 of the first manual pairing channel 378-1. Under this configuration, the wireless peripheral device 356 may be used to operate with the first information handling system 300-1 and the second information handling system 300-2, with dongle 390 under a dongle priority policy or with BT or BLE when dongle 390 is not present, without the user having to actuate or otherwise engage with the manual channel selection button 393 formed on the housing of the wireless peripheral device 356. In a specific use-case, the user may take the wireless peripheral device 356 to an office or other working location (with or without the dongle 390) to engage with the first information handling system 300-1 at that location and then take the wireless peripheral device 356 home or other location with the user and engage with the second information handling system 300-2 (with or without the dongle 390) without having to change physical manual pairing channels 378-1, 378-2, 378-3 on the wireless peripheral device 356 to operate the wireless peripheral device 356 with each of the first information handling system 300-1 and second information handling system 300-2. Two other physical manual pairing channels may be utilized under BT or BLE protocols to pair and wirelessly couple to two other information handling systems 300-3 and 300-4 in an embodiment as shown.

It is appreciated that any number of virtual pairing slots 370, 374 may be created by the wireless peripheral device hardware microcontroller and associated with the first manual pairing channel 378-1. In a specific embodiment, the number of virtual pairing slots 370, 374 may be limited to two as shown in FIG. 3. It is appreciated that where a user wishes to use the wireless peripheral device 356 with a third information handling system 300-3 or fourth information handling system 300-4, the user may actuate the manual channel selection button 393 to allow communication between the wireless peripheral device 356 and the third information handling system 300-3/fourth information handling system 300-4 via a BT or BLE wireless communication protocol or some other wireless communication protocol as described herein.

In an embodiment, where the dongle 390 is placed within a USB port of the third information handling system 300-3 or some other information handling system, the wireless peripheral device hardware microcontroller may recognize that the first virtual pairing slot 370 and second virtual pairing slot 374 have already been mapped with respective first BT pairing data and second BT pairing data as described herein. In an embodiment, the provisioning of any BT pairing data into any of the first virtual pairing slot 370 and second virtual pairing slot 374 may allow for the overwriting of the first BT pairing data and/or second BT pairing data when a new set of BT pairing data is to be associated with an of the first virtual pairing slot 370 or second virtual pairing slot 374. In an embodiment where all of the first virtual pairing slot 370 and second virtual pairing slot 374 are provisioned with BT pairing data already, the wireless peripheral device hardware microcontroller may select one of the first BT pairing data and second BT pairing data to be overwritten using, for example, a first-in, first-out overwriting process. This means that whichever of the first BT pairing data or second BT pairing data was first written to the first virtual pairing slot 370 or second virtual pairing slot 374, based on timestamp data of when provisioned, will be overwritten when this new BT pairing data is to be generated and associated with either of the first virtual pairing slot 370 or second virtual pairing slot 374. This allows a user to, for example, switch from an old or outdated information handling system (e.g., first information handling system 300-1) to a new or updated information handling system (e.g., third information handling system 300-3) such that the user need only insert the dongle 390 into a USB port of the new information handling system in order to overwrite any BT pairing data associated with the older information handling system into one of the first virtual pairing slot 370 or second virtual pairing slot 374.

Figure 4:
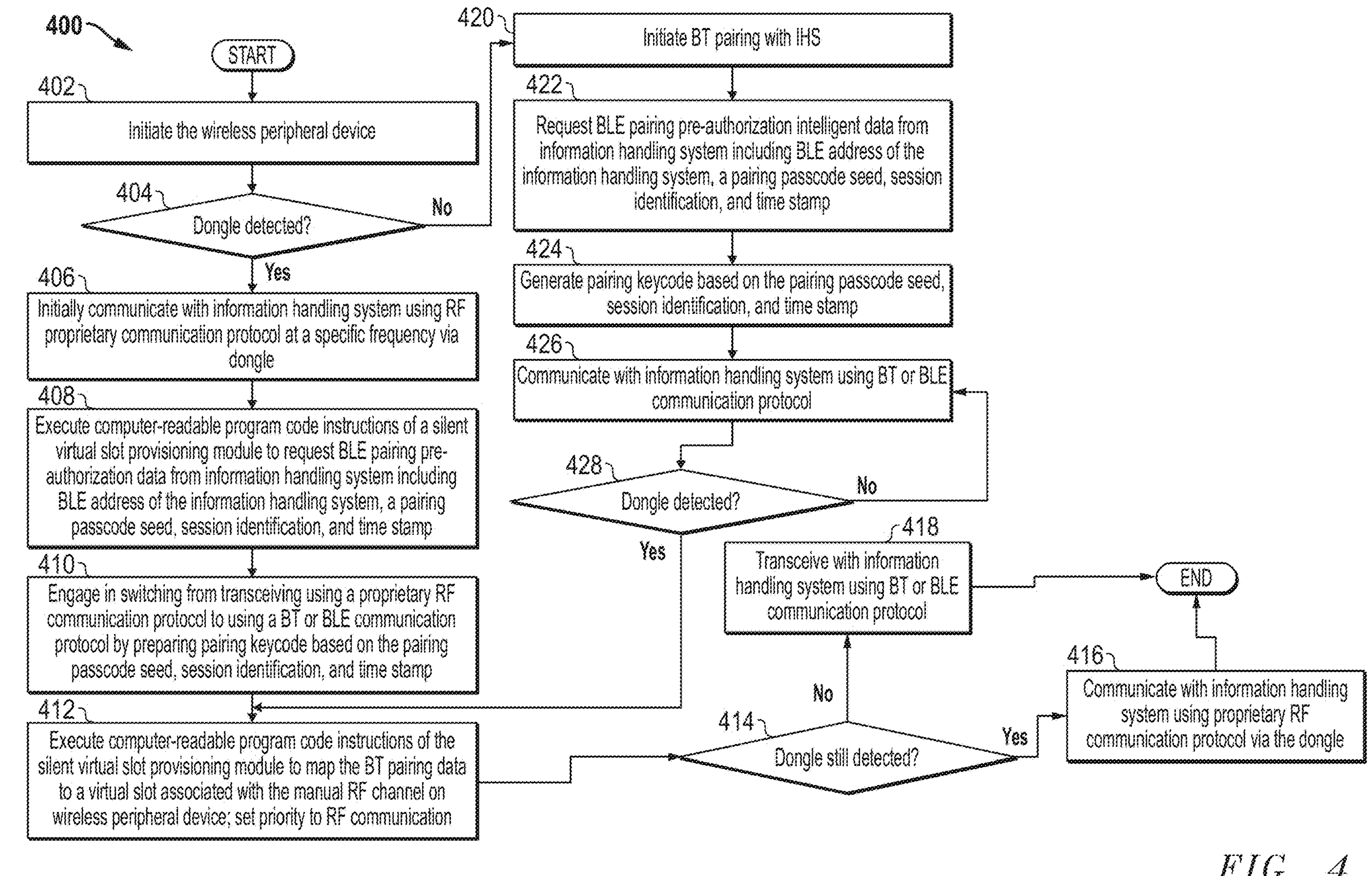
FIG. 4 is a flowchart showing a method of silently pairing a plurality of information handling systems to a wireless peripheral device according to an embodiment of the present disclosure.

FIG. 4 is a flowchart showing a method 400 of silently pairing a plurality of information handling systems to a wireless peripheral device according to an embodiment of the present disclosure. The method 400 may include, at block 402, the user initiating the wireless peripheral device. In an embodiment, initiation of the peripheral device may include a user actuating a button, switch, or key on the wireless peripheral device that causes power to be provide to the hardware processor such as a microcontroller of the wireless peripheral device and data storage device on the wireless peripheral device as well as other hardware devices of the wireless peripheral device such as a wireless peripheral device radio.

At block 404, the hardware microcontroller of the wireless peripheral device may detect whether a dongle is present. In an embodiment, the detection of the dongle may include the hardware microcontroller determining whether a wireless link has been established using the proprietary RF protocol at the wireless peripheral device radio or data is being transceived via a proprietary wireless RF protocol unique to the operation of the dongle. Additionally, because the dongle may be preprogrammed with pairing authentication data that is used to automatically wirelessly pair and bond the dongle with the wireless peripheral device, the hardware microcontroller of the wireless peripheral device may determine if this preprogrammed pairing authentication data is received in some embodiments.

Where the dongle is detected, the method 400 may include, at block 406, initially communicating with the information handling system using the RF proprietary communication protocol at a specific frequency via the dongle. This initial bonding of the wireless peripheral device to the information handling system facilitates the generation of a pre-authorization BT pairing data used to pair the wireless peripheral device to the information handling system via a second communication protocol such as via BT or BLE communication protocols.

At block 408, the method 400 includes the wireless peripheral device hardware microcontroller executing computer-readable program code instructions of the silent virtual slot provisioning module to request, automatically, BT pairing pre-authorization data from the information handling system via the proprietary RF protocol and the dongle when the dongle is detected as operating. In an embodiment, this BT pairing pre-authorization data may include a BT address of the first information handling system, a pairing passcode seed, a session identification value, and a time stamp. In an embodiment, the pairing passcode seed, session identification value, and time stamp may be generated by the hardware processor at the first information handling system. Alternatively, the pairing passcode seed, session identification value, and time stamp may be generated by the wireless peripheral device hardware microcontroller at the wireless peripheral device. In an embodiment, a seed generator at either of the information handling system or wireless peripheral device may be used to generate the pairing passcode seed. In an embodiment, a timeblock at either of the first information handling system or wireless peripheral device may be used to generate the time stamp.

At block 410, the method further includes engaging in pre-authorizing switching from transceiving between the wireless peripheral device and the information handling system using the proprietary RF communication protocol via the dongle to using BT or BLE communication protocol by preparing or generating a pairing keycode or passkey based on the pairing passcode seed, session identification, and time stamp. In an embodiment, each of the hardware processor and wireless peripheral device hardware microcontroller may execute computer-readable program code instructions of the OTP algorithm. In an embodiment, this OTP algorithm may concatenate the pairing passcode seed, the time stamp, and the session identification value in order to generate a BT pairing data. It is appreciated that because the hardware processor of the information handling system and the wireless peripheral device hardware microcontroller of the wireless peripheral device are executing the same OTP algorithm, each of the wireless peripheral device and information handling system generate the same BT pairing data used to subsequently pair and bond the wireless peripheral device to the information handling system using a BT pairing process that is preauthorized in such a way for when the dongle is not present or being used.

The method 400 also includes, at block 412, executing the computer-readable program code instructions of the silent virtual slot provisioning module to map a BT pairing data to the BLE virtual slot associated with the manual RF channel on the wireless peripheral device. In an embodiment, the wireless peripheral device hardware microcontroller may map the generated BT pairing data to the first virtual pairing slot associated with at least one of a first manual pairing channel, a second manual pairing channel, or any nth manual pairing channel defined by the wireless peripheral device hardware microcontroller in the wireless peripheral device. Additionally, in an embodiment, the hardware microcontroller may execute the computer-readable program code of the silent virtual slot provisioning module at block 412 to prioritize transceptions via the dongle by maintaining wireless transceptions with the information handling system via the dongle when the dongle is detected and switch to the first virtual pairing slot to use a Bluetooth wireless communication when the dongle is not detected.

At block 414, the peripheral device hardware microcontroller may determine whether the dongle is still detected. Where the dongle is still detected, the method 400 includes communicating with the information handling system using the proprietary RF communication protocol via the dongle. At this point the method 400 may end. Where, at block 414, the peripheral device hardware microcontroller may continue to transceive with the information handling system using a BT or BLE communication protocol that has been preauthorized on the first virtual pairing slot. At this point, the method 400 may end.

Returning to block 404, where the peripheral device hardware microcontroller does not detect the presence of the dongle, the method 400 continues to block 420 with the wireless peripheral device initiates a BT or BLE pairing process with the information handling system. In an embodiment, the execution of the BT or BLE pairing process by the wireless peripheral device hardware microcontroller may commence when the dongle is not initially detected as communicating between the wireless peripheral device and information handling system during a first pairing of the wireless peripheral device.

In an embodiment, the BT or BLE pairing process may include, at block 422, where the wireless peripheral device hardware microcontroller executing computer-readable program code instructions includes pre-loaded BT or BLE pairing credentials the silent virtual slot provisioning module to request, automatically, generate BT pairing preauthorization data at the information handling system. In an embodiment, this BT pairing authorization data may include a BT address of the first information handling system, a pairing passcode seed, a session identification value, and a time stamp. In an embodiment, the pairing passcode seed, session identification value, and time stamp may be generated by the hardware processor at the first information handling system. This authorization BT pairing data may be generated in preparation for pairing the information handling system to the wireless peripheral device with a BT or BLE pairing process that may be, for example, a minimal touch pairing mechanism using the pre-loaded BT pairing credential data, seed values or the like to generate pairing passcode for BT or BLE pairing. For example, a Dell Pair system may be used where encrypted exchange of generated passcodes, exchanged on a secure GATT or other BT or BLE communication link, or an exchange of some verifying data of the generated passcode to verify a match. Alternatively or additionally, the pairing passcode seed, session identification value, and time stamp may be generated by the wireless peripheral device hardware microcontroller at the wireless peripheral device in some embodiments. In an embodiment, a seed generator at either of the information handling system or wireless peripheral device may be used to generate the pairing passcode seed. In an embodiment, a timeblock at either of the first information handling system or wireless peripheral device may be used to generate the time stamp.

At block 424, the method includes generating a pairing keycode or passkey based on the pairing passcode seed, session identification, and time stamp. In an embodiment, each of the hardware processor and wireless peripheral device hardware microcontroller may execute computer-readable program code instructions of the OTP algorithm. Again, in an embodiment, this OTP algorithm may concatenate the pairing passcode seed, the time stamp, and the session identification value in order to generate a BT pairing data. It is appreciated that because the hardware processor of the information handling system and the wireless peripheral device hardware microcontroller of the wireless peripheral device are executing the same OTP algorithm, each of the wireless peripheral device and information handling system generate the same BT pairing data used to subsequently pair and bond the wireless peripheral device to the information handling system using a BT pairing process.

At block 426 the method 400 includes the wireless peripheral device communicating with the information handling system using a BT or BLE communication protocol such as via GATT BLE communications or pre-pairing communications for BT. Again, because the dongle was not detected, the wireless peripheral device may operatively couple with the information handling system. If the BT or BLE pairing is completed during this time, the wireless peripheral device may operatively couple with the information handling system and wireless data communications such as for HID data using the BT or BLE communication protocol to allow a user to provide input to the information handling system.

Again, at block 428, the peripheral device hardware microcontroller may determine whether the dongle is still detected. It may be that at any point during the BT or BLE pairing process or even after BT or BLE pairing has been completed and the wireless peripheral device may operatively couple with the information handling system to transceive wireless data communications using the BT or BLE communication protocol, the proprietary RF protocol dongle may be inserted in a USB port on the information handling system. Where the dongle is not detected, the method 400 returns back to block 426 and the wireless peripheral device continues to communicate with the information handling system via a BT or BLE communication protocol. Where the dongle is detected at block 428, the method 400 returns to block 412. Pursuant to a dongle priority policy being implanted, the information handling system and wireless peripheral device will switch to utilize the dongle and the proprietary RF protocol to conduct wireless data transmission and reception in embodiments herein. However, at block 412, the BT or BLE passcode authorization that is in the process of being completed at blocks 422 or 424 or has already been completed at block 426 will be used as generated preauthorization BT pairing data and will be mapped to a virtual slot of the manual RF channel on the wireless peripheral device. Then the flow may proceed as before to enable the information handling system and wireless peripheral device to utilize either the dongle when present or the BT or BLE wireless link via the virtual slot to transmit and receive wireless data communications according to embodiments herein. At this point, the method may end although it is understood that if the dongle is not detected at block 414, then wireless data may be transceived using the BT or BLE communication protocol at any of a plurality of virtual slot to transmit and receive wireless data communications from a plurality of different information handling systems. Further, the manual pairing channels may also be toggled to allow for pairing to other of a plurality of information handling systems such as via a BT or BLE paired wireless coupling according to embodiments herein.

The blocks of the flow diagrams of FIG. 4 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A wireless peripheral device comprising:

a hardware microcontroller;

a data storage device;

a wireless radio to operatively pair the wireless peripheral device to a plurality of information handling systems;

a power management unit to provide power to the hardware microcontroller, the data storage device, and the wireless radio;

the hardware microcontroller to detect the presence of a dongle installed at a first information handling system to transceive wireless data between the wireless peripheral device and the dongle at the first information handling system;

the hardware microcontroller to execute computer-readable program code instructions of a silent virtual slot provisioning module to, where the dongle is detected, request Bluetooth or Bluetooth Low Energy (BLE) pairing pre-authorization data from the first information handling system via the dongle to generate Bluetooth or BLE pairing data to conduct a Bluetooth or BLE wireless pairing with the first information handling system;

the hardware microcontroller to execute the computer-readable program code of the silent virtual slot provisioning module to map the generated Bluetooth or BLE pairing data to a first virtual pairing slot shared with a first manual pairing channel on the wireless peripheral device among a plurality of manual pairing channels; and the hardware microcontroller to execute the computer-readable program code of the silent virtual slot provisioning module to prioritize transceptions via the dongle by maintaining wireless transceptions with the first information handling system via the dongle when the dongle is detected and switch to the first virtual pairing slot to use a Bluetooth or BLE wireless communication when the dongle is not detected.

2. The wireless peripheral device of claim 1 further comprising:

wherein the hardware microcontroller uses a Bluetooth or BLE address of the information handling system to broadcast the Bluetooth or BLE pairing data via extended directed advertisement to the information handling system.

3. The wireless peripheral device of claim 1, wherein the Bluetooth or BLE pairing pre-authorization data includes a Bluetooth or BLE address of the first information handling system, a pairing passcode seed, a session identification value, and a time stamp.

4. The wireless peripheral device of claim 3 further comprising:

the hardware microcontroller to execute a one-time password algorithm to generate a one-time passcode to securely operatively couple the wireless peripheral device to the first information handling system.

5. The wireless peripheral device of claim 3 further comprising:

the hardware microcontroller to use the Bluetooth or BLE address of the first information handling system to broadcast the BT pairing data via extended directed advertisement to the first information handling system.

6. The wireless peripheral device of claim 1 further comprising:

the hardware microcontroller to generate additional Bluetooth or BLE pairing data and map the additional pairing data to additional virtual slots at the first manual pairing channel on the wireless peripheral device and overwrite Bluetooth or BLE pairing data when all virtual slots have been mapped, the overwriting process including a last-in, first-out overwriting process.

7. The wireless peripheral device of claim 1 further comprising:

the hardware microcontroller to execute computer-readable program code of the silent virtual slot provisioning module to associate a second virtual slot at the first manual pairing channel based on the dongle being detected at a second information handling system.

8. The wireless peripheral device of claim 1 further comprising:

the wireless peripheral device comprising a manual channel selection button to allow a user to manually toggle between the first manual pairing channel and one or more additional manual pairing channels among the plurality of manual pairing channels.

9. A method of silently pairing a plurality of information handling systems to a wireless peripheral device comprising:

detecting, with the hardware microcontroller of the wireless peripheral device, the presence of a dongle at an information handling system from dongle transmissions, the dongle to transceive wireless data between the wireless peripheral device and the dongle at the information handling system;

executing computer-readable program code of a silent virtual slot provisioning module with the hardware microcontroller to, where the dongle is detected, request Bluetooth or Bluetooth Low Energy (BLE) pairing pre-authorization data from the information handling system via the dongle to generate Bluetooth or BLE pairing data to conduct a Bluetooth or BLE wireless pairing with the information handling system;

executing the computer-readable program code of the silent virtual slot provisioning module with the hardware microcontroller to map the generated Bluetooth or BLE pairing data to a first virtual pairing slot among a plurality of virtual pairing slots at a first manual pairing channel on the wireless peripheral device among a plurality of manual pairing channels; and executing the computer-readable program code of the silent virtual slot provisioning module with the hardware microcontroller to prioritize transceptions via the dongle by maintaining wireless transceptions with the information handling system via the dongle when the dongle is detected and switch to the first virtual pairing slot to use a Bluetooth or BLE wireless communication when the dongle is not detected.

10. The method of claim 9 further comprising:

receiving at the hardware microcontroller a toggle selection from a manual channel selection button of the wireless peripheral device to manually toggle between the first manual pairing channel and one or more additional manual pairing channels among the plurality of manual pairing channels.

11. The method of claim 9 further comprising:

executing a one-time password algorithm with the hardware microcontroller to generate a one-time passcode to securely operatively couple the wireless peripheral device to the information handling system under a Bluetooth or BLE protocol.

12. The method of claim 11, wherein the hardware microcontroller uses the Bluetooth or BLE address of the information handling system to broadcast the Bluetooth or BLE pairing data via extended directed advertisement to the information handling system.

13. The method of claim 9 further comprising:

generating additional Bluetooth or BLE pairing data and mapping the additional pairing data to additional virtual pairing slots at the first manual pairing channel on the wireless peripheral device with the hardware microcontroller and overwriting Bluetooth or BLE pairing data when all virtual pairing slots have been mapped, the overwriting process including a last-in, first-out overwriting process.

14. The method of claim 9 further comprising:

executing computer-readable program code of a silent virtual slot provisioning module to associate a virtual pairing slot at the first manual pairing channel based on the dongle being detected at a second information handling system.

15. A wireless peripheral device comprising:

a hardware microcontroller;

a data storage device;

a wireless radio to operatively pair the wireless peripheral device to a plurality of information handling systems having a plurality of manual pairing channels;

a power management unit to provide power to the hardware microcontroller, the data storage device, and the wireless radio;

a plurality of manual pairing channels selectable by a user via actuation of a manual channel selection button;

the hardware microcontroller to detect the presence of a dongle installed at a first information handling system to wirelessly transceive wireless data between the wireless peripheral device and the dongle at the first information handling system;

the hardware microcontroller to execute computer-readable program code of a silent virtual slot provisioning module to, where the dongle is detected, request Bluetooth or Bluetooth Low Energy (BLE) pairing pre-authorization data from the information handling system to generate Bluetooth or BLE pairing data and to conduct a Bluetooth or BLE wireless pairing with the information handling system;

the hardware processor to execute the computer-readable program code of the silent virtual slot provisioning module to map the generated Bluetooth or BLE pairing data to a first virtual pairing slot among a plurality of virtual pairing slots at a first manual pairing channel for dongle wireless communications on the wireless peripheral device among a plurality of manual pairing channels of the wireless peripheral device; and the hardware microcontroller to execute the computer-readable program code of the silent virtual slot provisioning module to prioritize transceptions via the dongle by maintaining wireless transceptions with the information handling system via the dongle when the dongle is detected and switch to the first virtual pairing slot to use a Bluetooth or BLE wireless communication when the dongle is not detected.

16. The wireless peripheral device of claim 15 further comprising:

a manual channel selection button to allow a user to manually toggle between the first manual pairing channel and one or more additional manual pairing channels among the plurality of manual pairing channels.

17. The wireless peripheral device of claim 15, wherein the Bluetooth or BLE pairing pre-authorization data includes a Bluetooth or BLE address of the information handling system, a pairing passcode seed, a session identification value, and a time stamp.

18. The wireless peripheral device of claim 17 further comprising:

the hardware microcontroller to execute a one-time password algorithm to generate a one-time passcode to securely operatively couple the wireless peripheral device to the information handling system under a Bluetooth or BLE protocol.

19. The wireless peripheral device of claim 17 further comprising:

the hardware microcontroller to use the Bluetooth or BLE address of the information handling system to broadcast the Bluetooth or BLE pairing data via extended directed advertisement to the information handling system.

20. The wireless peripheral device of claim 15 further comprising:

the hardware microcontroller to execute computer-readable program code of a silent virtual slot provisioning module to associate a second virtual slot at the first manual pairing channel based on the dongle being detected at a second information handling system.

* * * * *